United States Patent
Brown et al.

(10) Patent No.: US 6,665,838 B1
(45) Date of Patent: Dec. 16, 2003

(54) WEB PAGE THUMBNAILS AND USER CONFIGURED COMPLEMENTARY INFORMATION PROVIDED FROM A SERVER

(75) Inventors: Michael Wayne Brown, Georgetown, TX (US); Kelvin Roderick Lawrence, Round Rock, TX (US); Michael A. Paolini, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/364,740

(22) Filed: Jul. 30, 1999

(51) Int. Cl.$^7$ ............................................. G06F 17/21
(52) U.S. Cl. ..................... 715/501.1; 715/513; 715/526
(58) Field of Search .......................... 715/500.1, 501.1, 715/513, 526, 517, 530

(56) References Cited

U.S. PATENT DOCUMENTS

| | | | |
|---|---|---|---|
| 5,099,426 A | 3/1992 | Carlgren et al. | 364/419 |
| 5,227,771 A | 7/1993 | Kerr et al. | 340/731 |
| 5,365,360 A | 11/1994 | Torres | 395/159 |
| 5,416,901 A | 5/1995 | Torres | 395/159 |
| 5,491,783 A | 2/1996 | Douglas et al. | 395/159 |
| 5,550,969 A | 8/1996 | Torres et al. | 395/159 |
| 5,615,320 A | 3/1997 | Lavendel | 395/131 |
| 5,623,652 A | 4/1997 | Vora et al. | 395/610 |
| 5,699,458 A | 12/1997 | Sprague | 382/250 |
| 5,704,060 A | 12/1997 | Del Monte | 395/600 |
| 5,715,443 A | 2/1998 | Yanagihara et al. | 395/603 |
| 5,737,599 A | 4/1998 | Rowe et al. | 395/615 |
| 5,737,733 A | 4/1998 | Eller | 727/3 |
| 5,742,816 A | 4/1998 | Barr et al. | 395/615 |
| 5,745,889 A | 4/1998 | Burrows | 707/2 |
| 5,754,776 A | 5/1998 | Hales, II et al. | 395/200.34 |
| 5,787,435 A | 7/1998 | Burrows | 707/102 |
| 5,793,966 A | 8/1998 | Amstein et al. | 395/200.33 |
| 5,797,008 A | 8/1998 | Burrows | 395/612 |
| 5,809,502 A | 9/1998 | Burrows | 707/7 |
| 5,812,134 A | 9/1998 | Pooser et al. | 345/356 |
| 5,812,999 A | 9/1998 | Tateno | 707/3 |
| 5,819,032 A | 10/1998 | de Vries et al. | 395/200 |
| 5,826,261 A | 10/1998 | Spencer | 707/5 |
| 5,854,597 A | 12/1998 | Murashita et al. | 341/51 |
| 5,860,071 A | 1/1999 | Ball et al. | 707/100 |
| 5,864,863 A | 1/1999 | Burrows | 707/103 |
| 5,870,549 A | 2/1999 | Bobo, II | 395/200 |
| 5,873,076 A | 2/1999 | Barr et al. | 707/3 |
| 6,182,072 B1 * | 1/2001 | Leak et al. | 707/10 |
| 6,271,840 B1 * | 8/2001 | Finseth et al. | 345/349 |

* cited by examiner

Primary Examiner—Stephen S. Hong
(74) Attorney, Agent, or Firm—Duke W. Yee; Jeffrey S. LaBaw; Stephen R. Tkacs

(57) ABSTRACT

A method for presenting content from the page in a distributed database. In a preferred embodiment, a server receives a request from a client for a page from the database wherein the page has a plurality of links to linked pages in the database. The server retrieves the page and generates a set of thumbnails of the linked pages in the database. The server then sends the page and the set of thumbnails to the client.

12 Claims, 12 Drawing Sheets

WEB PAGE THUMBNAILS AND USER CONFIGURED COMPLEMENTARY INFORMATION PROVIDED FROM A SERVER

CROSS REFERENCE TO RELATED APPLICATIONS

The present application is related to copending U.S. patent application Ser. No. 09/364,694 entitled "Automatic Web Page Thumbnail Generation"), U.S. patent application Ser. No. 09/364,696 entitled "Navigation Assistant—Method and Apparatus for Providing User Configured Complementary Information for Data Browsing in a Viewer Context"), U.S. patent application Ser. No. 09/364,693 entitled "Method and System for Providing a Graphical Tree View of Web Pages"), and U.S. patent application Ser. No. 09/364,695 entitled "Web Page Thumbnails with Active Hot Links") filed even date herewith. The above mentioned patent applications are assigned to the assignee of and share the same inventors as the present invention. The content of the cross referenced copending applications are hereby incorporated herein by reference.

BACKGROUND OF THE INVENTION

1. Technical Field

The present invention relates to an improved computer system and in particular to computer software and more particularly to web browser software. Still more particularly, the present invention provides a method and apparatus for filtering and previewing data.

2. Description of Related Art

The "Internet" is a globally accessible network of computers that collectively provide a large amount and variety of information to users. From services of the Internet such as the World Wide Web (or simply, the "web"), users may retrieve or "download" data from Internet network sites and display the data that includes information presented as text in various fonts, graphics, images, and the like having an appearance intended by the publisher. As the information revolution has exploded, more and more information is available through the internet. However, finding particular pieces of information out of the millions of "web sites" available can be daunting.

One way of sorting through this mass of information to find what is of interest for a particular user is through the use of "search engines". Search engines are software written to search, among the millions of web sites, for certain key words or criteria entered by a user, and to return to the user a list of links (references to other HTML pages) to the sites that the search engine determines to be most relevant to the criteria entered by the user. Different search engines use different methods of determining the relevance of web sites, but most use some sort of quantitative method that determines the relevance of a site based on how many times the key words appear in that particular site.

Search engines typically return only a list of links to relevant sites with perhaps a short verbal description of the site. Often times, this list does not provide sufficient information to enable one to make an intelligent decision as to whether to follow the link. Thus, the user is left with the time consuming task of sorting through the links returned by the search engine to determine which of these is the best match. Furthermore, no mechanism is present for a user to determine, based on the search engine results, whether the site is still active or if it has been removed. This problem can be seen by referring to FIG. 1, which depicts a screen image of a returned search result from Altavista. Each link includes only a brief description of the site, but no indication of whether the link is still good or whether the link contains an excessive quantity of broken links within it.

Similar problems exist with regard to following links from one web page to another (sometimes referred to as "web surfing"). Often times, users find the information they are looking for by following links on web pages, but the same problem exist here as with search engines. Many times the links will have only short descriptions about the contents of the web page to which they link. Furthermore, many times a web page will contain a dead link and there is no way the user can determine this except by trial and error.

Therefore, it would be beneficial for Internet users to have a tool to enable them to make more informed decisions about which links to follow. Furthermore, performance of web browsing needs to be dramatically improved. To this end it would be advantageous if server based hardware and software could be applied to the task of accelerating and enhancing client customers usage of a domain.

SUMMARY OF THE INVENTION

The present invention provides a method for presenting content from the page in a distributed database. In a preferred embodiment, a server receives a request from a client for a page from the database wherein the page has a plurality of links to linked pages in the database. The server retrieves the page and generates a set of thumbnails of the linked pages in the database. The server then sends the page and the set of thumbnails to the client.

In another preferred embodiment, the present invention provides a method of browsing the Internet. A server receives user criteria and a request for a page from the Internet from a client. The server retrieves the page and parses the page for a set of links to a set of linked web pages. The server then retrieves the set of linked pages and parses the set of linked pages for user selected criteria. Responsive to finding the user criteria on a linked page within the set of linked pages, the server modifies the page to indicate the presence of the user criteria on the linked page and sends a modified page to the client.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
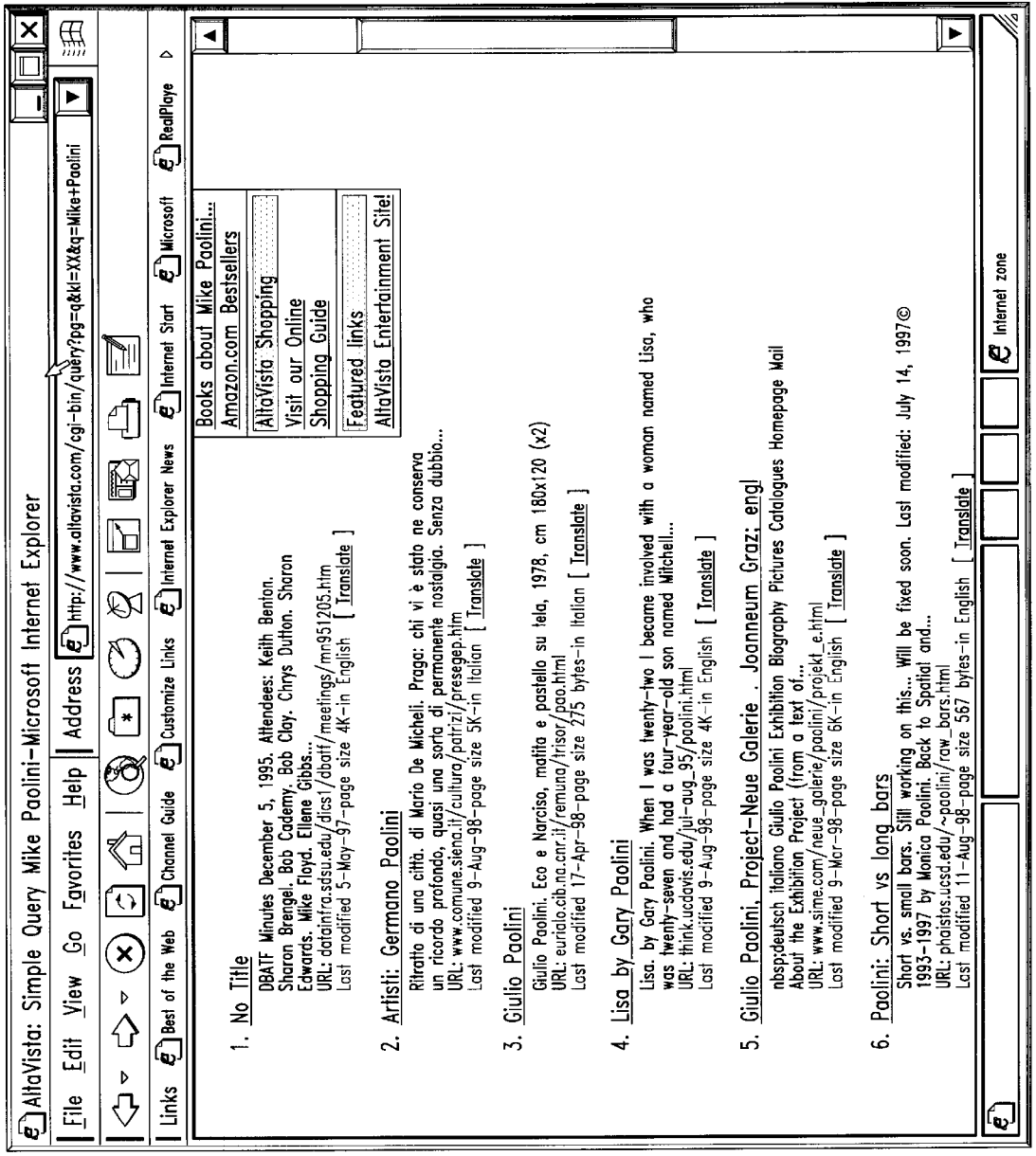
FIG. 1 (Prior Art) depicts a screen image of search results presented using Altavista without aid of the present invention.
Figure 2:
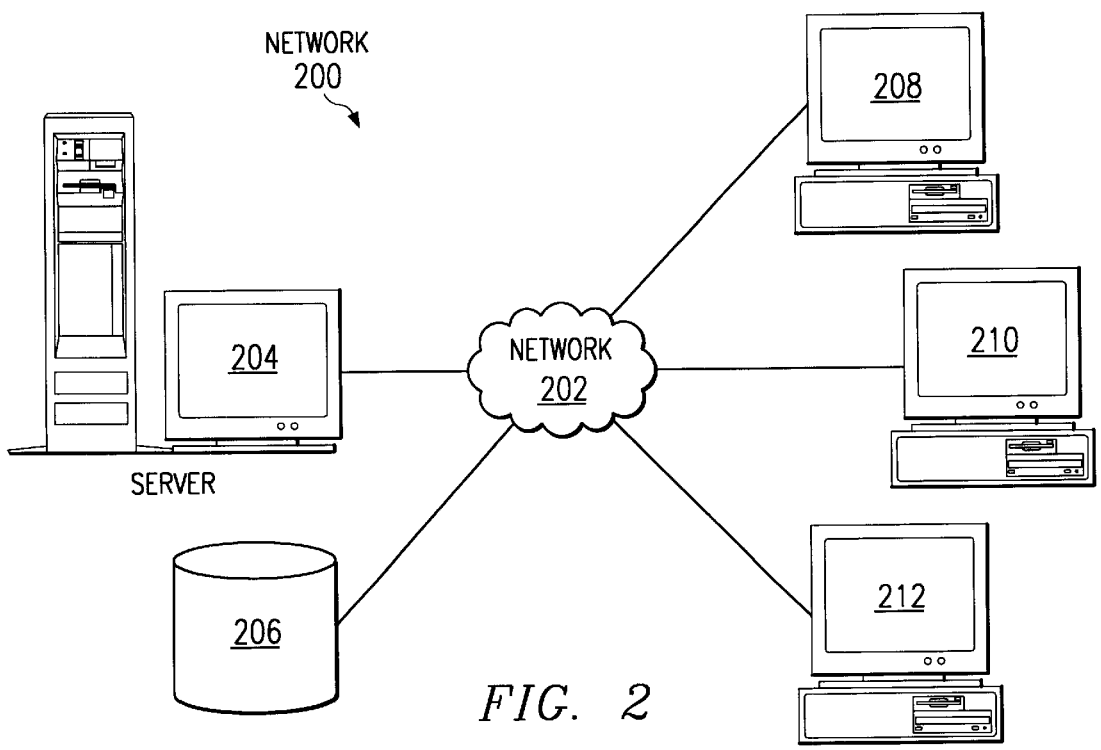
FIG. 2 depicts a pictorial representation of a distributed data processing system in which the present invention may be implemented.

With reference now to the figures, and in particular with reference to FIG. 2, a pictorial representation of a distributed data processing system is depicted in which the present invention may be implemented.

Distributed data processing system 200 is a network of computers in which the present invention may be implemented. Distributed data processing system 200 contains network 202, which is the medium used to provide communications links between various devices and computers connected within distributed data processing system 200. Network 202 may include permanent connections, such as wire or fiber optic cables, or temporary connections made through telephone connections.

In the depicted example, server 204 is connected to network 202, along with storage unit 206. In addition, clients 208, 210 and 212 are also connected to network 202. These clients, 208, 210 and 212, may be, for example, personal computers or network computers. For purposes of this application, a network computer is any computer coupled to a network which receives a program or other application from another computer coupled to the network. In the depicted example, server 204 provides data, such as boot files, operating system images and applications, to clients 208–212. Clients 208, 210 and 212 are clients to server 204. Distributed data processing system 200 may include additional servers, clients, and other devices not shown. Distributed data processing system 200 also includes printers 214, 216 and 218. A client, such as client 210, may print directly to printer 214. Clients such as client 208 and client 212 do not have directly attached printers. These clients may print to printer 216, which is attached to server 204, or to printer 218, which is a network printer that does not require connection to a computer for printing documents. Client 210, alternatively, may print to printer 216 or printer 218, depending on the printer type and the document requirements.

In the depicted example, distributed data processing system 200 is the Internet, with network 202 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 200 also may be implemented as a number of different types of networks such as, for example, an intranet or a local area network.

FIG. 2 is intended as an example and not as an architectural limitation for the processes of the present invention.

In an overview of the present invention, a Domain or Proxy Server can be enhanced to provide automatically generated or manually overridden thumbnails of web pages. This can be done over any suitable Client/Server Internet protocol CGI, HTTP, etc.

One preferred embodiment would entail the user selecting a web page, while the web page is being sent to the client the server would also build a list of thumbnails for the selected web page. Building of the thumbnail list would entail checking a cache for existing thumbnails, as well as parsing and generating thumbnails on the fly. Then depending on the current options selected between the client and the server and current bandwidth considerations the server would send the thumbnails along with the rest of the web page.

The Domain Server can choose to individually generate a thumbnail to be delivered to each client, or it can generate a "default user" thumbnail per each web page requested and cache it using existing means for subsequent client requests. In either case, it is advantageous to render the thumbnail on a server to reduce internet and/or intranet bandwidth requirements.

The manual override capability referenced above gives web content companies the ability to continue using their selected Banner(s) in cases where that would be advantageous. Also they may choose to manually fine tune the automatically generated thumbnail of any or all of their web pages.

Additionally, a Proxy Server can automatically, or by client request, generate thumbnails for its clients. In this fashion an ISP or Intranet IS shop, can distinguish itself by providing this enhanced browsing capability, for all the domains its clients choose to browse.

Figure 3:
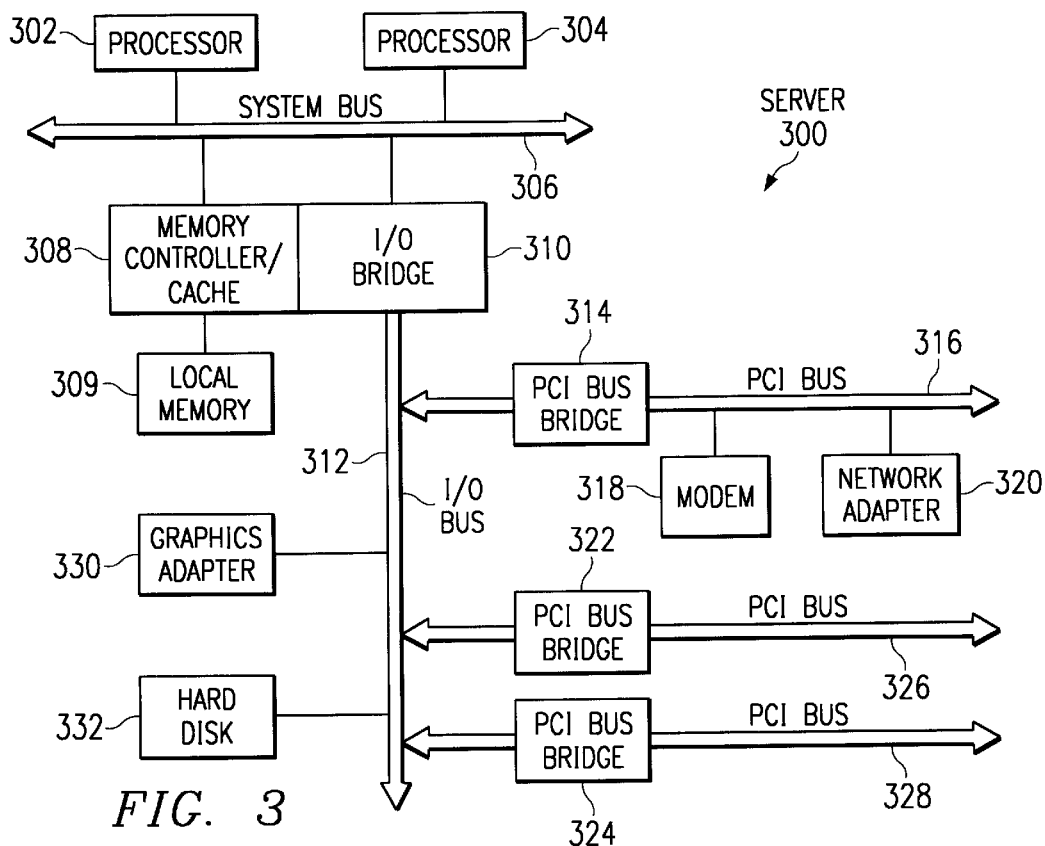
FIG. 3 depicts a block diagram of a data processing system that may be implemented as a server.

Turning now to FIG. 3, a block diagram of a data processing system which may be implemented as a server, such as server 204 in FIG. 2, is depicted in accordance with the present invention. Data processing system 300 may be a symmetric multiprocessor (SMP) system including a plurality of processors 302 and 304 connected to system bus 306. Alternatively, a single processor system may be employed. Data processing system 300 is suitable as a domain host or other server connected to the Internet. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 316. A number of modems 318–320 may be connected to PCI bus 316. Typical PCI bus implementations will support four PCI expansion slots or add-in connectors. Communications links to network computers 208–212 in FIG. 2 may be provided through modem 318 and network adapter 320 connected to PCI local bus 316 through add-in boards.

Additional PCI bus bridges 322 and 324 provide interfaces for additional PCI buses 326 and 328, from which additional modems or network adapters may be supported. In this manner, server 300 allows connections to multiple network computers. A memory mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 3 may be, for example, an IBM RISC/System 6000, a product of International Business Machines Corporation in Armonk, N.Y, running the Advanced Interactive Executive (AIX) operating system.

Figure 4:
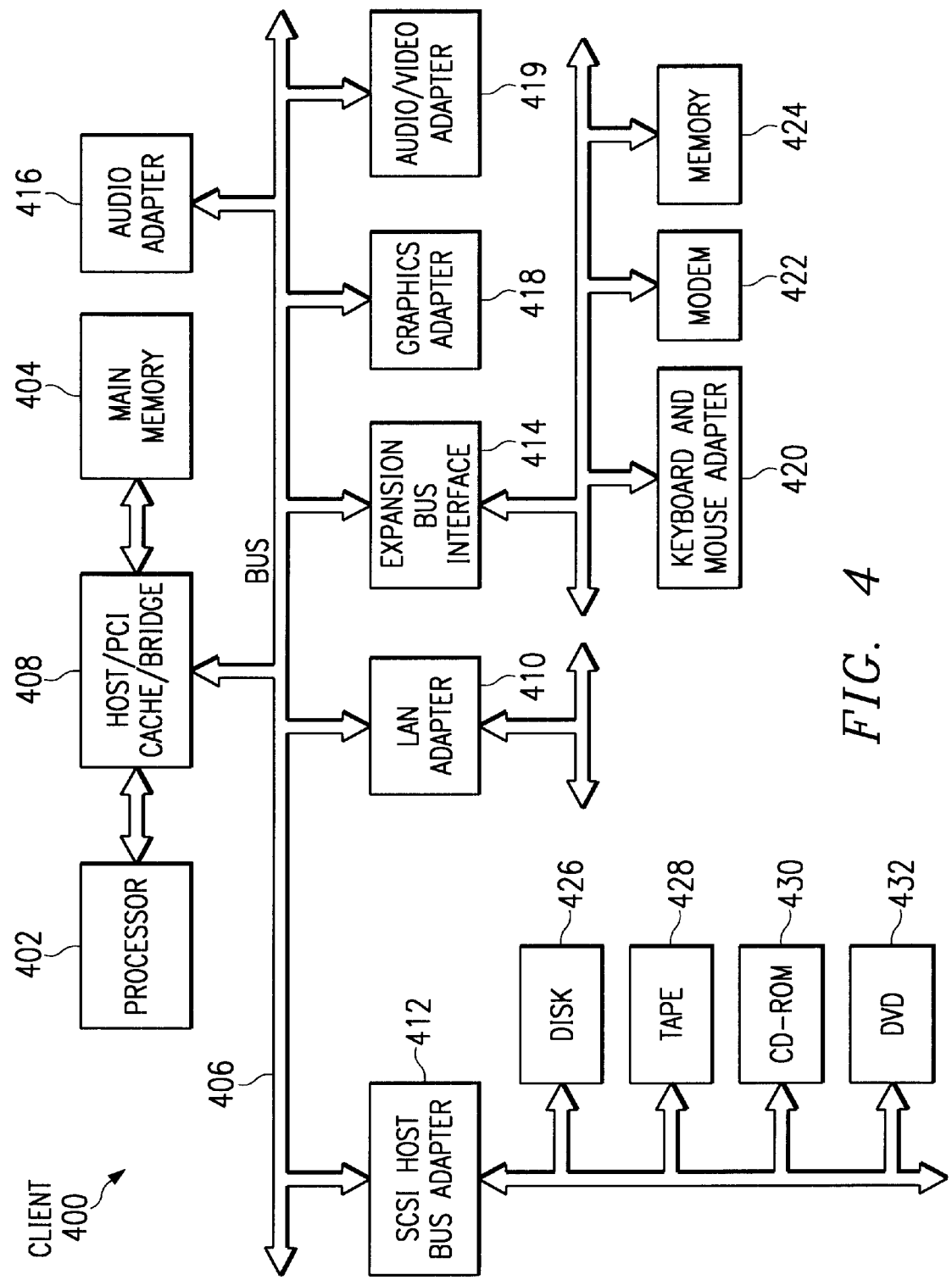
FIG. 4 depicts a block diagram of a data processing system that may be used as a client computer in accordance with the present invention.

With reference now to FIG. 4, a block diagram of a data processing system in which the present invention may be implemented is illustrated. Data processing system 400 is an example of a client computer. Data processing system 400 is suitable from running web browsing programs such as Netscape Navigator and Microsoft Internet Explorer, such programs being compatible with the present invention. Data processing system 400 employs a peripheral component interconnect (PCI) local bus architecture. Although the depicted example employs a PCI bus, other bus architectures, such as Micro Channel and ISA, may be used. Processor 402 and main memory 404 are connected to PCI local bus 406 through PCI bridge 408. PCI bridge 408 may also include an integrated memory controller and cache memory for processor 402. Additional connections to PCI local bus 406 may be made through direct component interconnection or through add-in boards. In the depicted example, local area network (LAN) adapter 410, SCSI host bus adapter 412, and expansion bus interface 414 are connected to PCI local bus 406 by direct component connection. In contrast, audio adapter 416, graphics adapter 418, and audio/video adapter (A/V) 419 are connected to PCI local bus 406 by add-in boards inserted into expansion slots. Expansion bus interface 414 provides a connection for a keyboard and mouse adapter 420, modem 422, and additional memory 424. In the depicted example, SCSI host bus adapter 412 provides a connection for hard disk drive 426, tape drive 428, CD-ROM drive 430, and digital video disc read only memory drive (DVD-ROM) 432. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 400. Instructions for the operating system, the object-oriented operating system, and applications or programs are located on a storage device, such as hard disk drive 426, and may be loaded into main memory 404 for execution by processor 402.

Those of ordinary skill in the art will appreciate that the hardware in FIG. 4 may vary depending on the implementation. For example, other peripheral devices, such as optical disk drives and the like, may be used in addition to or in place of the hardware depicted in FIG. 4. The depicted example is not meant to imply architectural limitations with respect to the present invention. For example, the processes of the present invention may be applied to multiprocessor data processing systems.

Figure 5:
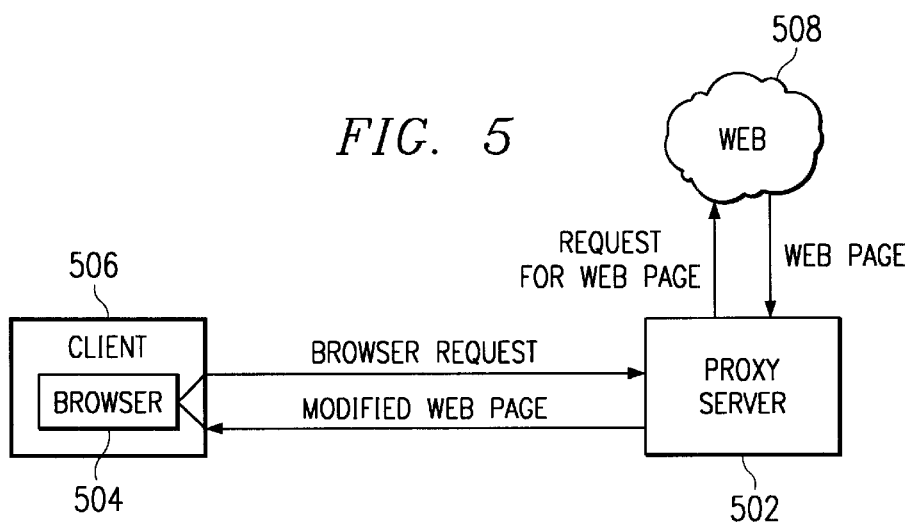
FIG. 5 shows a block diagram illustrating the flow of information between a client and a server.

Turning now to FIG. 5, there is shown a block diagram illustrating the flow of information between a client and a server. Proxy server 502, which may be implemented as server 200, receives requests for web content from browser 504 within client 506. Server 502 retrieves the requested information from the web 508. Server 502 retrieves the web pages associated with the links in the requested web page from the web 508 and generates thumbnails, icons, or other information desired by the user. Server 502 may modify the requested web page and send the user the modified web page containing thumbnails, icons, or some other modification. Alternatively, server 502 may send the user the unmodified web page and the thumbnails, icons, etc. as extra data wherein browser 504 determines how to use this extra data.

Figure 6:
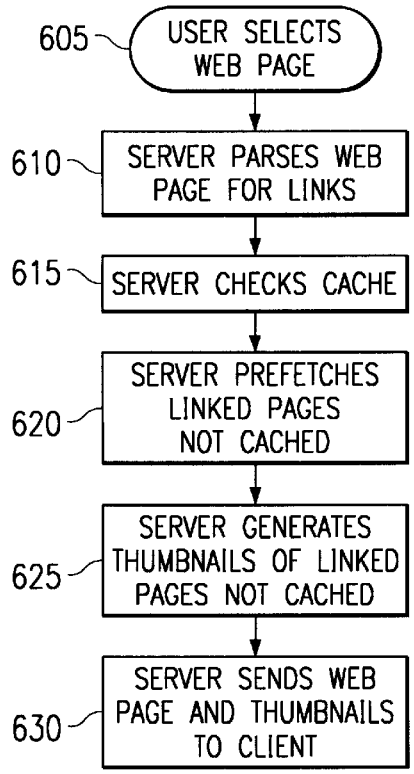
FIG. 6, a flow chart illustrating an over view of a preferred embodiment of the present invention is shown wherein the thumbnails are generated on a server.

Turning now to FIG. 6, a flow chart illustrating an overview of a preferred embodiment of the present invention is shown wherein the thumbnails are generated on a server, such as server 204 in FIG. 2. As a user selects a web page for viewing (step 605), a Domain or Proxy server (hereinafter referred to simply as server) parses the user selected web page for links to other web pages (step 610). While the web page is being sent to the user, the server checks a cache for existing thumbnails (step 615) and prefetches linked pages not cached (step 620). The server then generates thumbnails of linked pages that do not have an existing thumbnail in the cache (step 625). Next, the server sends the thumbnails along with the rest of the web page to the user.

The server can choose to individually generate a thumbnail to be delivered to each user, or it can generate a "default user" thumbnail per each web page requested, and cache it using existing means for subsequent user requests. That is to say, a preferred embodiment of the present invention enables customized thumbnail generation on a user-by-user basis. For example, perhaps a user chooses to receive black and white thumbnail images, or perhaps a larger (or smaller) than average thumbnail. It would also be possible to replace the image entirely, or just certain pieces of it. In any case, it is advantageous to render thumbnails on a server to reduce internet and/or intranet bandwidth requirements.

A manual override capability gives web content companies the ability to continue using their selected banner(s) in cases where that would be advantageous. In this manner, the web content company could choose the thumbnail image to be displayed next to links linking to one of their web pages. Furthermore, the web content company could choose to send an icon that represents that company to the user to be displayed next to the link rather than an image of the linked page itself. The icon could be any image they choose, for example, it could be the Coca-Cola logo if the linked page belongs to Coca-Cola. Also, the web content company may choose to manually fine tune the automatically generated thumbnail of any or all of their web pages. Furthermore, the server can automatically, or by client request, generate thumbnails for its users. In this fashion, an internet service provider ("ISP") or Intranet information services shop can distinguish itself by providing this enhanced browsing capability for all the domains its clients choose to browse. This method can be done over any suitable client/server Internet protocol such as CGI, HTTP, etc.

Figure 7:
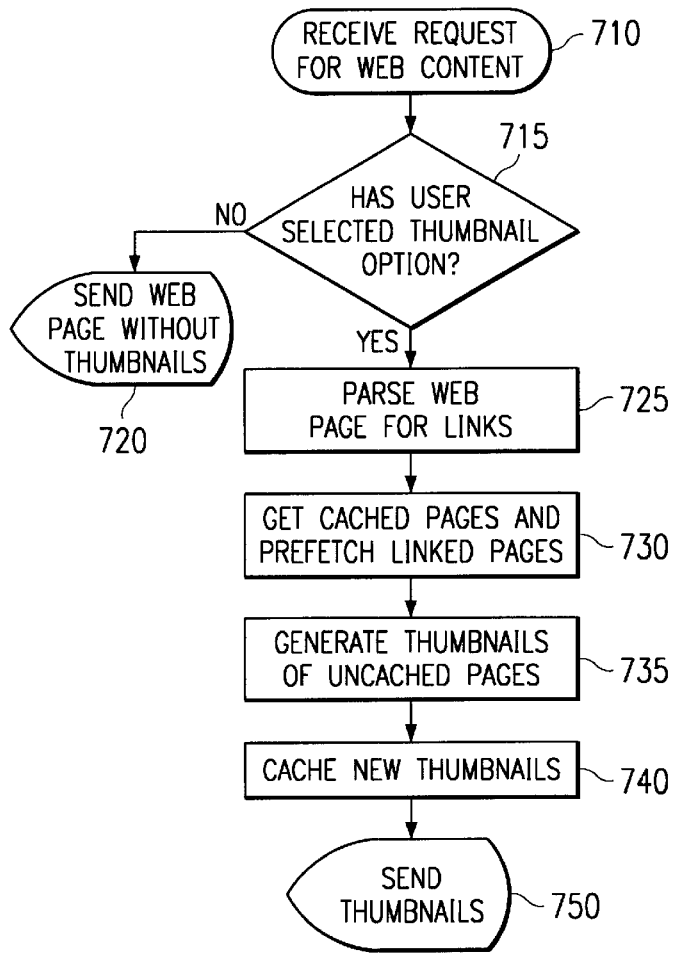
FIG. 7 shows a flowchart providing a more detailed understanding of the method illustrated in FIG. 6.

A more detailed understanding of a preferred embodiment of the present invention is disclosed with reference to the flowchart illustrated in FIG. 7. As a server, such as server 200, receives a request for web content from a user (step 710), the server determines from the request whether the user has selected the thumbnail option (step 715). If the thumbnail option has not been selected, then the server sends the web page without thumbnails in the customary fashion (step 720).

If the thumbnail option has been selected, then the server parses the web page for links to other web pages (step 725). The server then checks the cache for linked pages and prefetches the linked pages that are not in the cache (step 730) using the server's prefetch mechanism. The server then generates thumbnails of each linked page that does not already have a thumbnail in the cache (step 735) and then stores the newly generated thumbnails in the cache (step 740).

Next, the server sends the thumbnails to the user (step 750). In one embodiment, the web page is regenerated with the thumbnails included and the modified web page is sent to the user. In another embodiment, the web page sends the thumbnails along with the unmodified web page to the user. One method of modifying the web page prior to sending the web page with thumbnails is generating the web page such that, when the web page is viewed by the user, the thumbnails are displayed in-line (that is each thumbnail is placed below the preceding thumbnail in a vertical line) near the corresponding link on the currently displayed web page as illustrated in FIG. 8.

Although, preferably, the thumbnails are automatically placed in-line by the server near the corresponding link on the selected web page. However, in alternate embodiments, the user might be queried for placement preferences, such as maximum distance from the link or preferred placement in terms of top, right, left, below, above, separate, etc.

Figure 8:
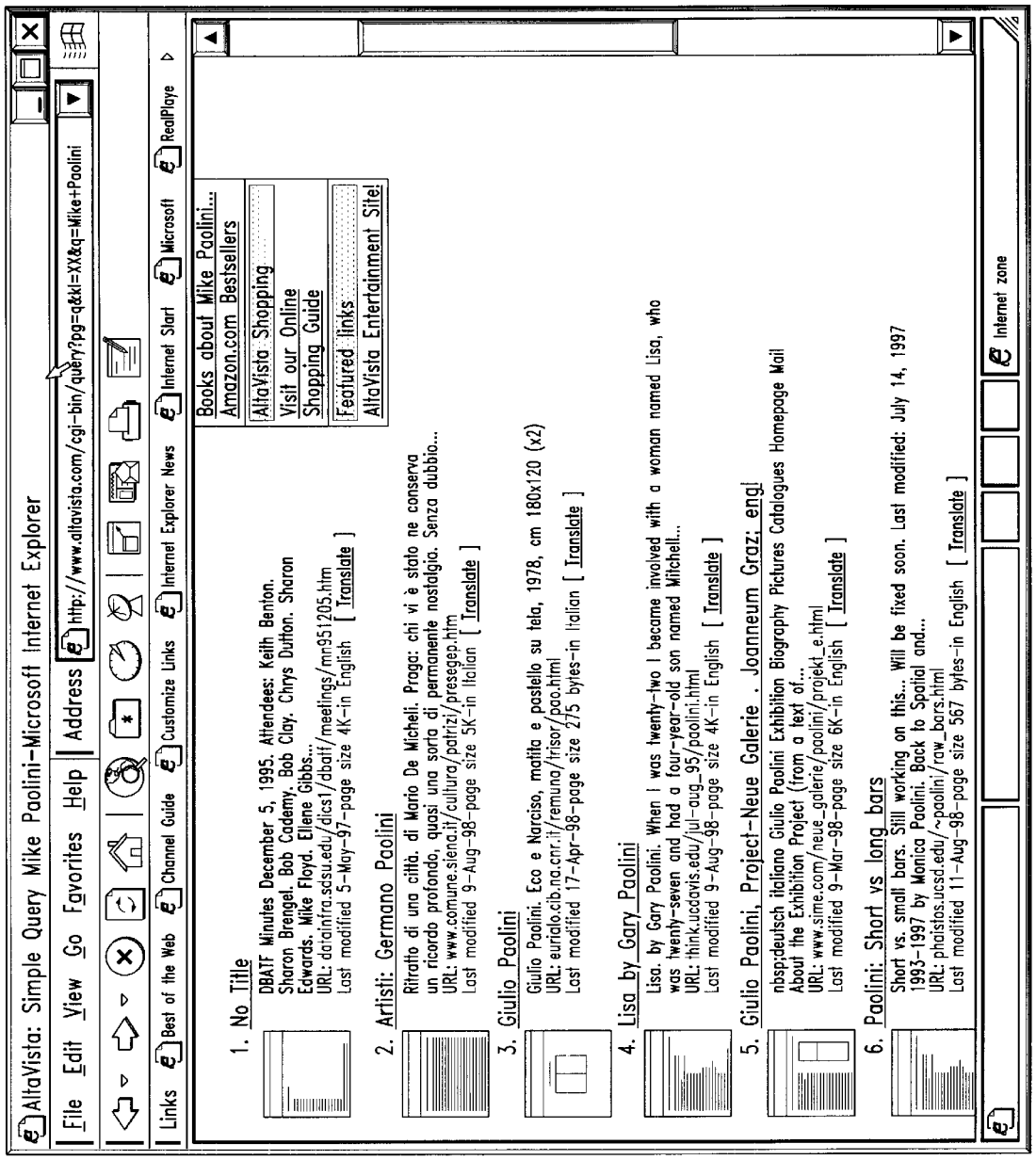
FIG. 8 shows a screen image of the display of a web page including thumbnails.

Also illustrated in FIG. 8 is a pointer 800 that allows a user to select various areas of a display. Pointer 800 may be manipulated, for example, by means of a mouse, a stylus pen, a joystick, or arrow keys. However, these are just a few methods of manipulating a pointer. Other examples are well known to those skilled in the art.

Figure 9:
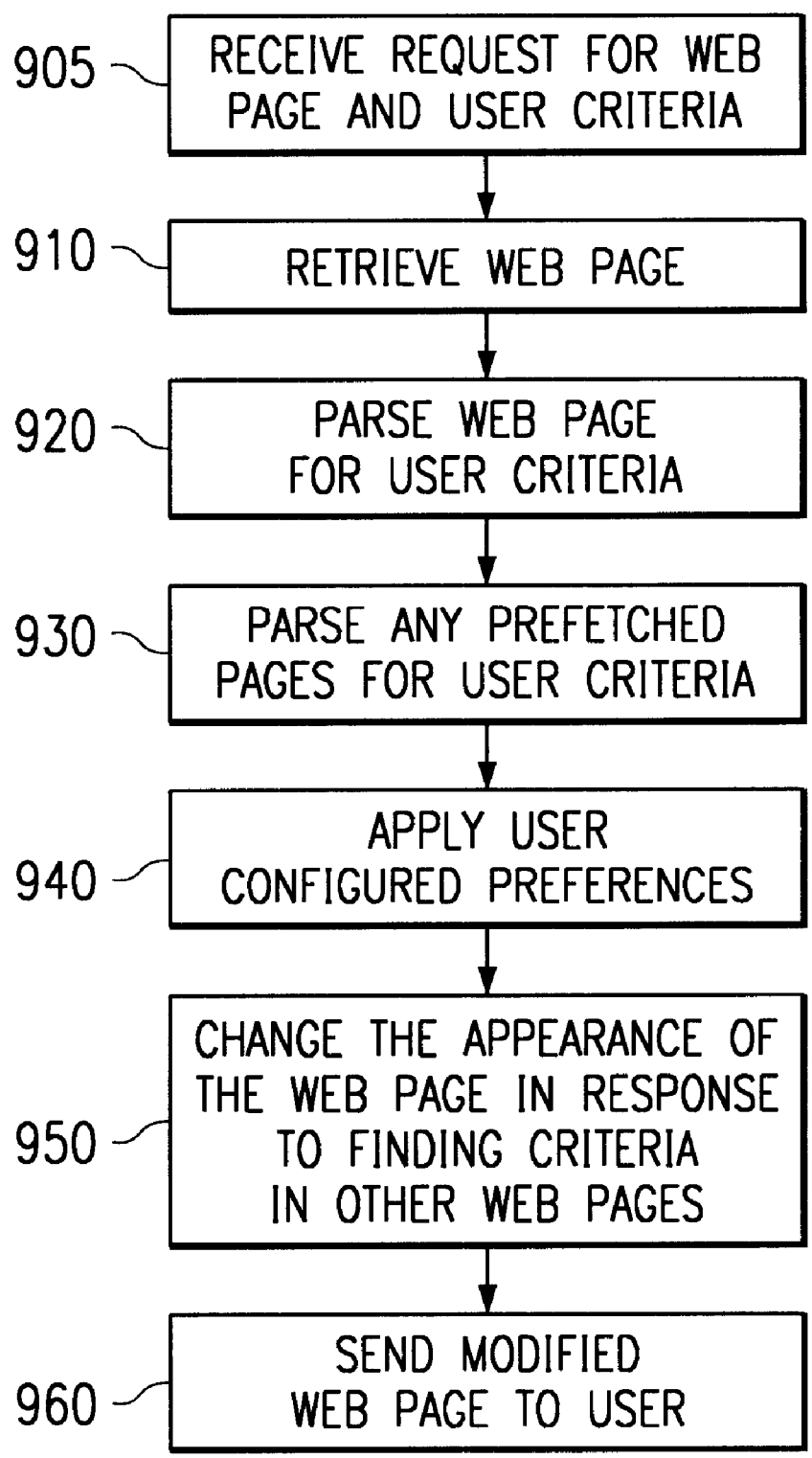
FIG. 9 shows a flowchart illustrating a basic overview for modifying the appearance of a web page in accordance with user selected criteria.

Turning now to FIG. 9, there is shown a flowchart illustrating a basic overview for modifying the appearance of a web page in accordance with user selected criteria. A server receives a request for web content from a user along with user selected criteria (step 905) and then retrieves the requested web content (step 910). The server then parses the web page for user specified criteria (step 920). The web pages associated with any links found on the retrieved web page are prefetched and the server then parses the prefetched web pages for user specified criteria (step 930). If the prefetch fetches web pages that are several links removed from the presently viewed web page, the navigation assistant can parse these pages for user specified criteria as well. If the server finds some or all of the user specified criteria in the current web page or in one of the prefetched web pages, the current web page's appearance is changed in a user configured manner (step 950). Ideally, the change in the appearance would effect the representation of the link or the data found in a user customizable way. This may be actual modification of the data (in the case of HTML, the HTML source file which is downloaded to the browser would be modified to insert such things as tags (<b></b>(bold) or <i></i>(italics)), new icons, replacement of images, etc. On the other hand it might also be done in a way that did not effect the raw data (e.g., the HTML source), but only the appearance of the unmodified data with regard to the viewer/browser. Either way this may mean inserting an icon at the presence of the data (e.g., an icon of a small eye as the character before a word or picture which had the preferred data as an alternate reference), or it may mean changing text color, text size, changing the font (e.g., making it bold or italic or both) or adding a translucent shading over an image or text, causing the text or image to appear selected (e.g., the same shading that occurs when you use a "find in document command"—typically inverting the text) or even adding a border or colored border around a word or image. It may also mean replacing or overlaying the data with something the user configured such as a "Do Not Enter Sign" or drawing a box around it.

Figure 10:
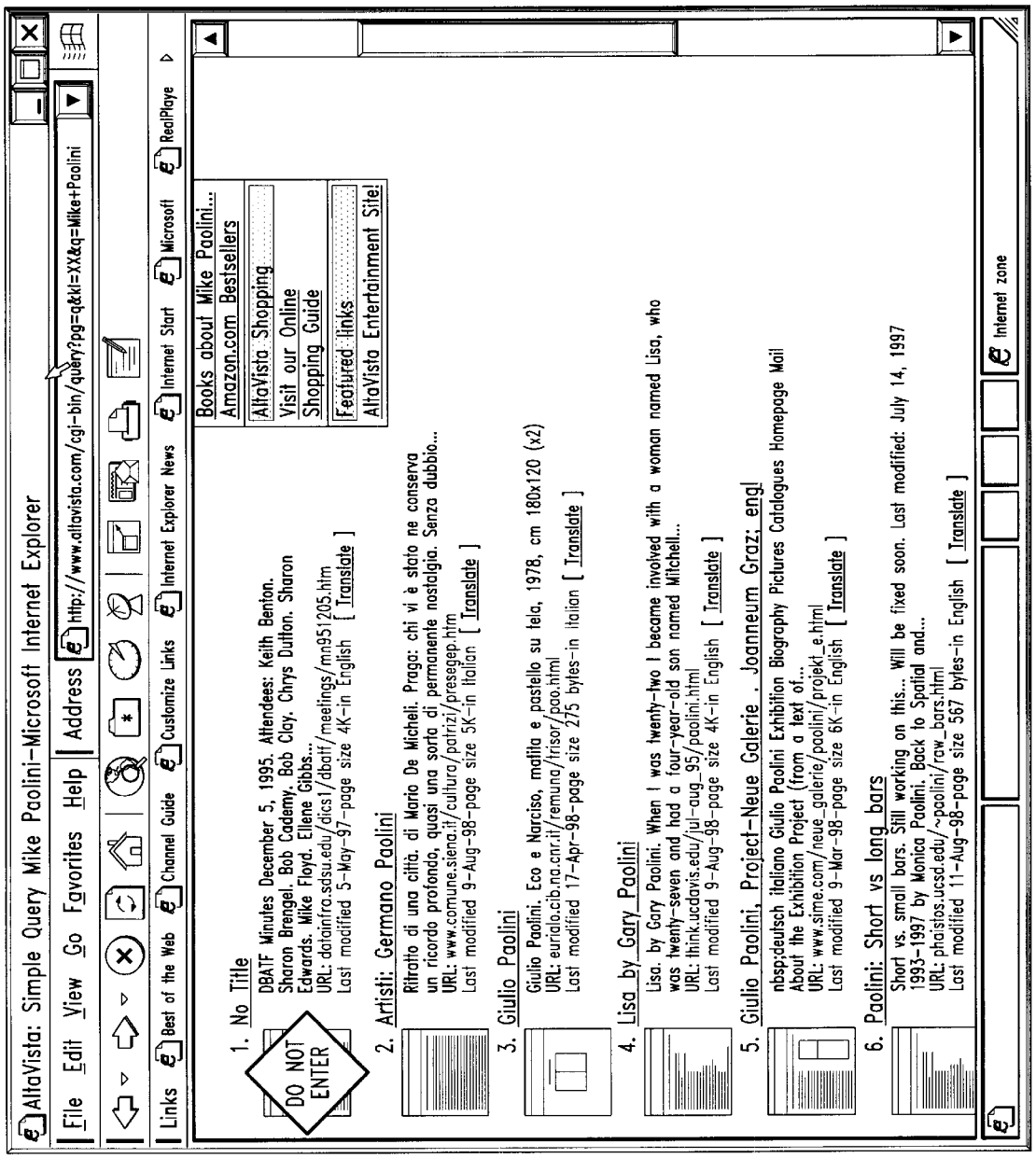
FIG. 10 illustrates an example of the modification of the web page in a user configured manner to indicate the presence or absence of user selected criteria.

FIG. 10 illustrates an example of the modification of the web page in a user configured manner to indicate the presence or absence of user selected criteria. As illustrated in FIG. 10, the filtering program has detected undesirable content on the first linked page displayed in the search results. Thus, the thumbnail has been modified to have a diamond with "do not enter" written on it placed over the thumbnail image. These are but a few examples of modifications that can be made to the thumbnails and are not meant to be exhaustive. Other modifications to the thumbnail images, such as to indicate the presence of a dead link, will be obvious to those skilled in the art.

Figure 11A:
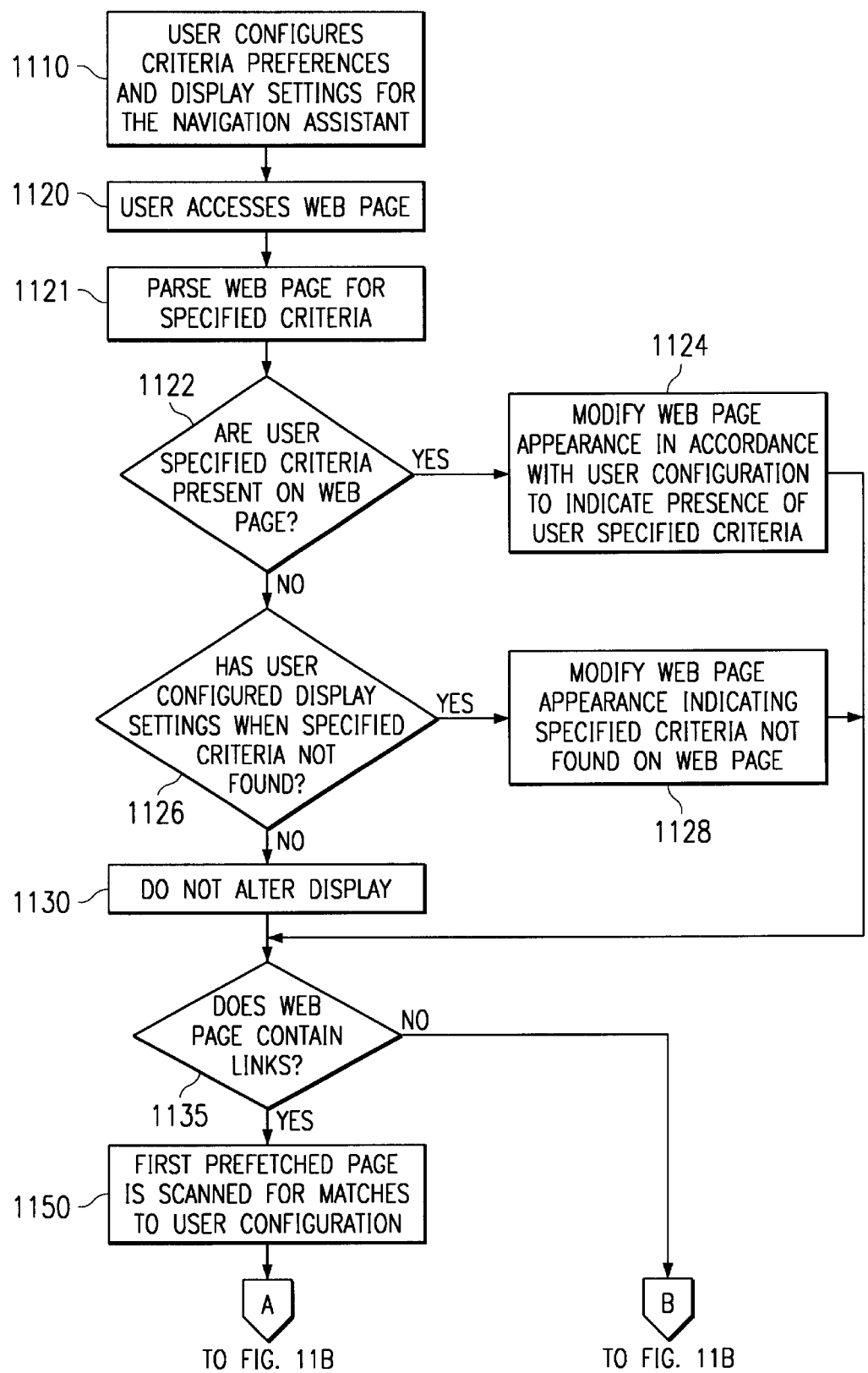
FIG. 11 shows a more detailed flowchart of the method depicted in FIG. 9.
Figure 11B:
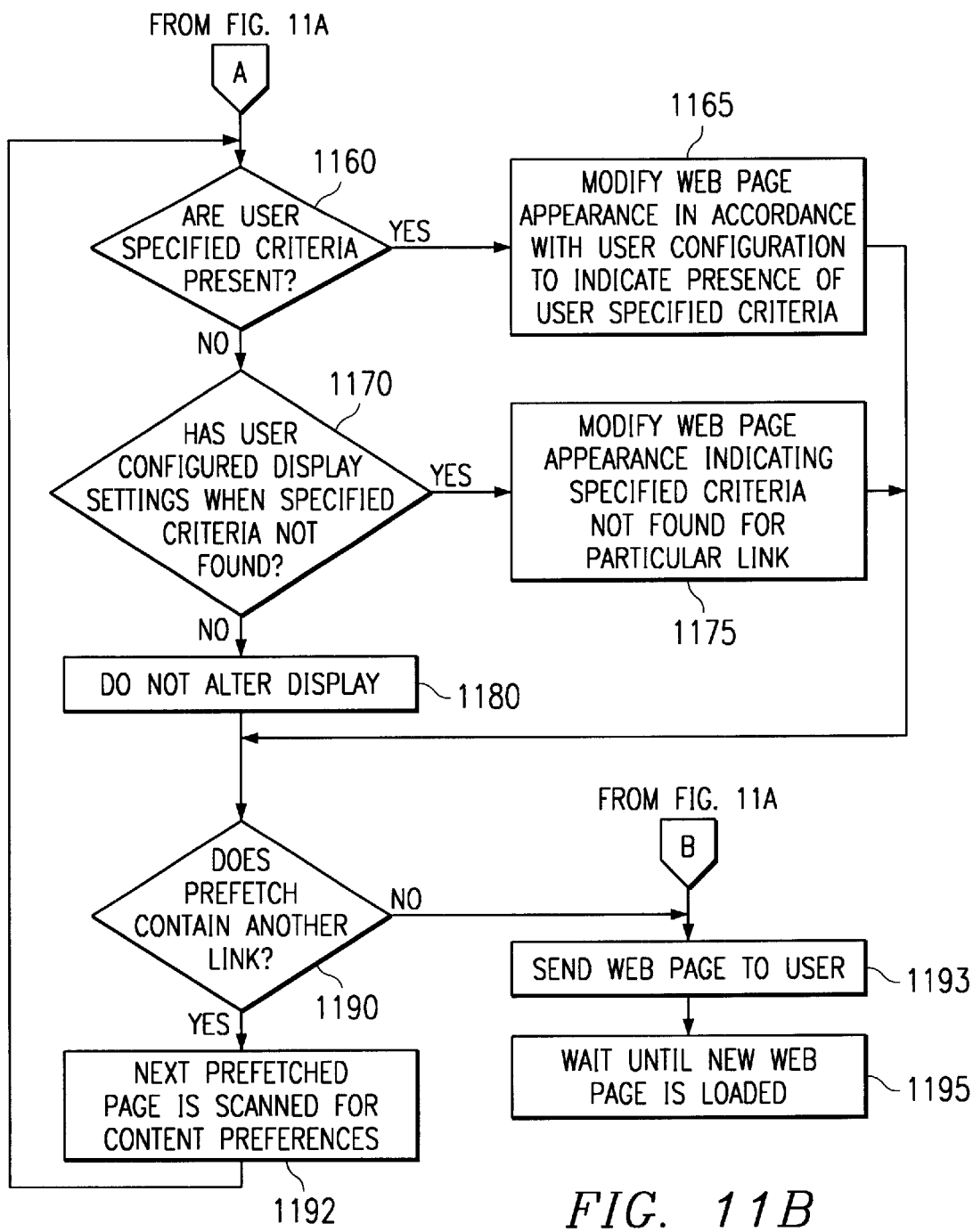

A more detailed flowchart of the method depicted in FIG. 9 is depicted in FIG. 11. A user configures display and content preferences for the navigation assistant (step 1110). The user accesses a web page using a web browser, such as Netscape Navigator or Microsoft Internet Explorer (step 1120). While the web page is being loaded and presented to the user, the web page is parsed for user specified criteria (step 1121). If user specified criteria are present on the web page (step 1122), then the web page appearance is modified in accordance with user configured display preferences to indicate the presence of user specified criteria (step 1124). If no user specified criteria are present on the web page (step 1122), then the navigation assistant determines if the user has configured a display setting when criteria not found (step 1126). If display settings have been set for when criteria not found (step 1126), then the web page appearance is modified to indicate that no user specified criteria are present on the web page (step 1128). A determination is made as to whether display setting have been set for indicating the lack of criteria (step 1126). If no display settings have been set for indicating the lack of criteria, then the web page appearance is not altered (step 1130).

After parsing the web page and configuring display settings in response to the presence or absence of user specified criteria, the navigation assistant parses the web page to determine if it contains links (universal resource locators "URLs") to other web pages (step 1135). If it does not, then the navigation assistant waits until a new web page is loaded at which point the process is repeated (step 1195). If the web page does contain links to other web pages (step 1135), then the server prefetches these other links (step 1150). If no the web page does not contain links to other web pages (step 1135), then the web page (with modifications, if any) is sent to the user (step 1193) and then the server waits until the user requests a new web page (step 1195).

If linked web pages have been prefetched (step 1140), then the first prefetched page is scanned for matches to user configured document preferences (step 1150). Steps 1150 and 1160 correspond to step 930 in FIG. 9. The server then determines whether user specified criteria are present in this first prefetched page (step 1160).

If user's specified criteria are present within this first prefetched page, then the appearance of the currently displayed web page is modified in accordance with user display configurations to indicate the presence of user specified criteria (step 1165). However, if none of the user's specified criteria are present, then the server determines whether the user has configured display settings for links that lack specified criteria (step 1170). If the user has configured display settings for links corresponding to web pages that lack specified criteria specified by the user, then the web page appearance is modified in accordance with these display preferences (step 1175). If no display settings have been configured for web pages not containing any user specified criteria, then the web page appearance is not altered (step 1180).

After the web page has been modified or left unaltered, depending on the results of scanning the first prefetched page, the server determines whether another linked page has been prefetched (step 1190). If another prefetched page exists, then this prefetched page is scanned for content preferences (step 1192) and the process of steps 1160 through 1190 are repeated until there are no prefetched pages that have not been scanned for user configured specified criteria. Steps 1160 through 1195 correspond to the processes of steps 940 and 950 shown in FIG. 9. At such point, the server will send the web page (in its modified form if it was modified) to the user (step 1193) and then waits for a new web page to be requested from the user (step 1195).

Figure 12:
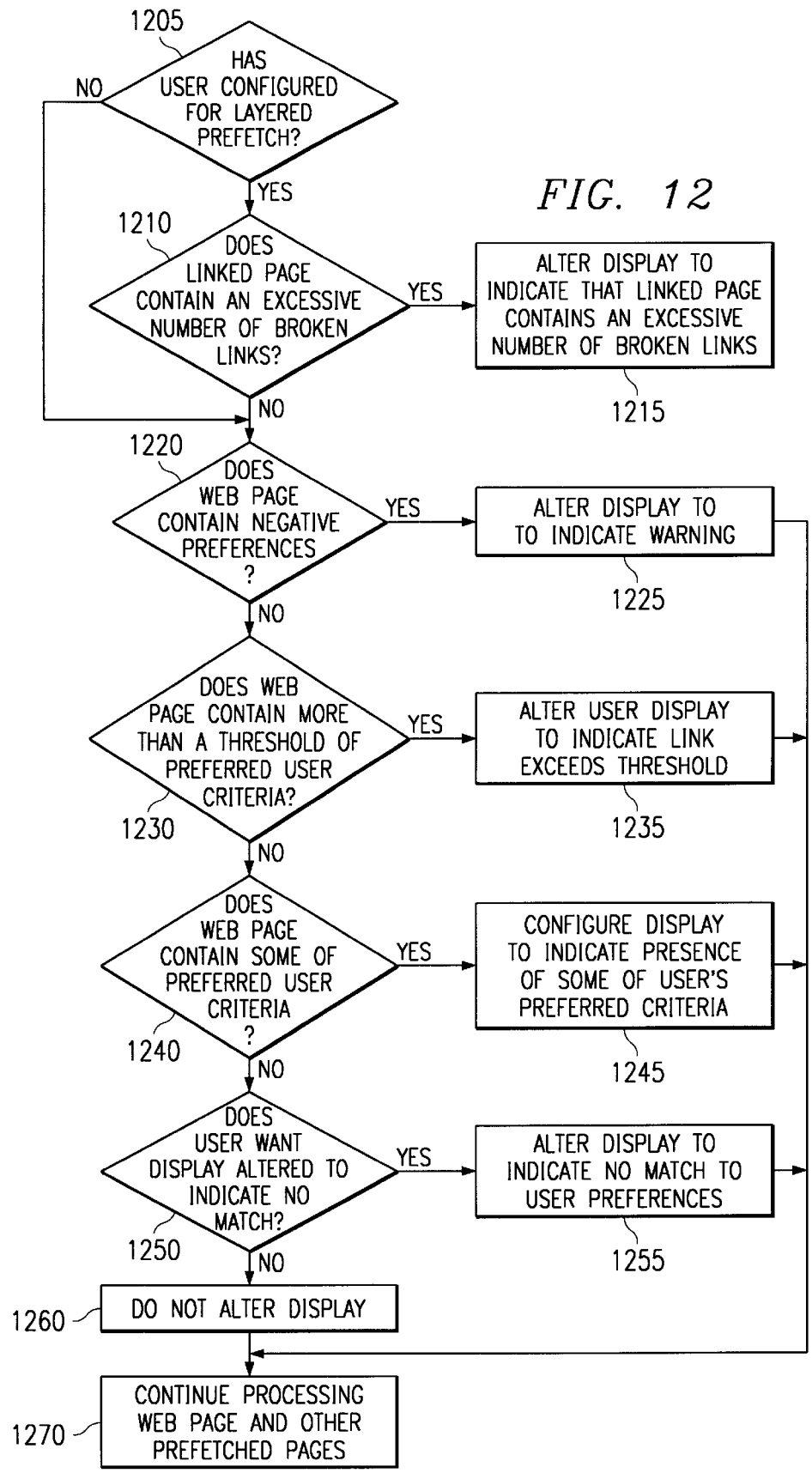
FIG. 12 shows a flowchart providing a more detailed understanding of the steps involved in modifying the presentation of the web page (steps 1122–1130 and steps 1160–1180 of FIG. 11)

A more detailed understanding of the steps involved in modifying the presentation of the web page (steps 1122–1130 and steps 1160–1180 of FIG. 11) is given with reference to FIG. 12. The server must first determine whether the user has configured the preferences for a layered prefetch (step 1205). In a layered prefetch, the navigator not only prefetches the web pages associated with the links on the currently displayed web page (first layer), but also prefetches the web pages associated with links on the web pages associated with the links on the currently displayed web page (second layer). This layered prefetch can be carried out to multiple layers (greater than two) as far as the user wishes consistent hardware and software constraints such as available memory and download speed.

If the user has configured the preferences for a layered prefetch, the server determines whether each linked web page contains an excessive number of broken links (step 1210). What constitutes an excessive number is determined by the user or plugin maker and can be given in terms of absolute numbers or in percentage of broken links to good links. A broken link is a link that, if followed, does not retrieve a web page or retrieves a web page containing a message indicating that the subject matter has moved, been removed, etc. If the navigator determines that the linked web page contains an excessive number of broken links, then the display is altered in some manner to indicate that the web page associated with that particular link contains an excessive number of broken links (step 1215). As an example, this could be accomplished by modifying the color of the link to perhaps gray where gray would be an indication to the user that the link contains an excessive number of broken links. Another example would be to display an image next to the link where the image would indicate that the web page associated with the link contains an excessive number of broken links. However, each of these is merely an example of a method of indicating the information to the user and, therefore, do not limit the scope of the present invention. Additionally, the server could parse second, third, etc. level pages for excessive broken links, etc.

If the user has not configured for a layered prefetch (step 1205) or if the web page associated with the link does not contain an excessive number of broken links (step 1210), then the navigator parses the present web page or prefetched web page, as the case may be, to determine whether it contains user configured negative preferences (step 1220). Negative preferences may be content related where the user has indicated key words or subject matter which is not wanted such as adult oriented material. Other examples of negative preferences include or relate to the size of the web page; avi's; music; number of links; number of images; total size of images; JavaScript presence; Java Applet presence; domain name suffix; author; and date of information, i.e. less than seven days old. If such unwanted material or characteristics are present on the web page, then the appearance of the currently viewed web page is altered to reflect such information (step 1225). Examples of such modification include presenting an image of a circle with a line through it next to the link to indicate that the associated web page contains unwanted characteristics.

If the web page does not contain negative preferences, then the web page is parsed to determine if it contains more than a threshold amount of positive preferences (step 1230). Positive preferences (or criteria) are preferences that the user desires in a web page. The positive preferences may relate to content and key words or it can relate to characteristics about the web page itself such as date of creation, author, etc. Thus, the same kinds of information can be searched for whether desired (positive preferences) or unwanted (negative preferences). Other examples of user specified criteria or preferences include determining the speed of the download for a particular linked page or whether a web page is secure (these could also be included as negative criteria as well). If the amount of positive preferences exceeds a threshold (step 1230), then the appearance of the current web page is modified to indicate such information (step 1235).

If the web page does not contain more than a threshold of preferred user criteria (step 1230), but does contain some of the preferred user criteria (step 1240), then the appearance of the web page is altered to indicate the presence of some of the user's criteria (step 1245).

However, if the web page does not contain any of the user's criteria (step 1240), then the server determines whether the user has chosen a configuration which alters the display if a web page contains no matches to the user's criteria (step 1250). If the user has configured the server to alter the appearance of the web page, then the server changes the appearance of the web page to indicate that that particular link does not contain any matches to the user's specified criteria (step 1255). Examples of changes to appearance include changing the color of the link to gray or to displaying an image next to the link indicating that none of the user's criteria were matched by the link.

If the user has not chosen a configuration in which the server alters the appearance of the web page, then the web page appearance is left as it is (step 1260). The server, after modifying (as in steps 1225, 1235, 1245, or 1255) or leaving display unaltered (as in step 1260), continues processing the web page and other web pages in the same fashion for other user specified criteria until all of the user specified criteria have been searched for in the viewed web page as well as in any and all prefetched web pages (step 1270).

Although the present invention has been described primarily with reference to modifying the appearance of the web page to indicate the presence or absence of user preferences, this is not the only option for conveying this information to the user. Other options exist as will be obvious to one skilled in the art. Other examples include, but are not limited to, opening another window on the user's computer and displaying the desired or undesired information within the new window, having the appropriate information "pop-up" as the user's pointer passes over a link, or indicating to the user through sounds as the user passes over a link whether that link matches some or more of the user's preferred criteria. Furthermore, combinations of options could be provided as well. For example, a general indication of desired or undesired material may change the appearance of the link. However, when the pointer is proximate to a particular link, details as to which criteria are present can then be listed in a popup.

Figure 13:
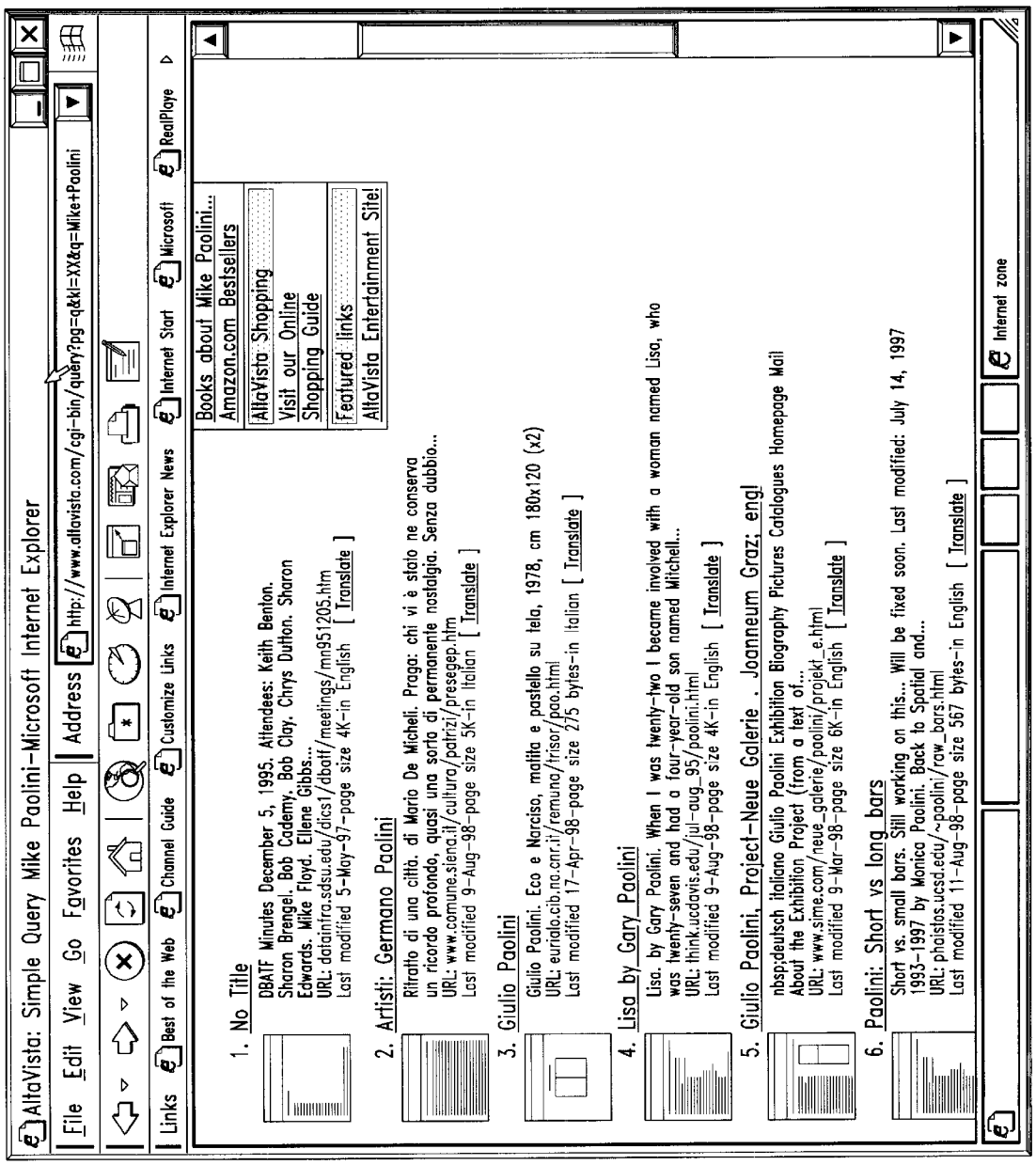
FIGS. 13–14 depict the screen images of search results returned by AltaVista with varying modifications to the displayed page.

Another possibility for indicating to the user the presence or absence of preferred criteria is in combination with thumbnail images of the linked pages. As the linked pages are prefetched, a thumbnail image of the linked page is generated and presented to the user to aid the user in navigating the web. For example, FIG. 13 depicts the screen image of search results returned by Altavista. The thumbnail image of each linked page is displayed in line next to the link. In one embodiment of the present invention, a dark border is placed around the thumbnail of links that contain matches to the user's undesirable criteria. Thus enabling the user to avoid wasting time with those pages. In the example depicted in FIG. 13, the first link having no title has a dark border indicating it is a page containing features the user does not desire. The fourth link entitled Lisa by Gary Paolini has a gray border placed around the thumbnail image of the linked page to indicate that some of the user's criteria were found in this page.

Figure 14:
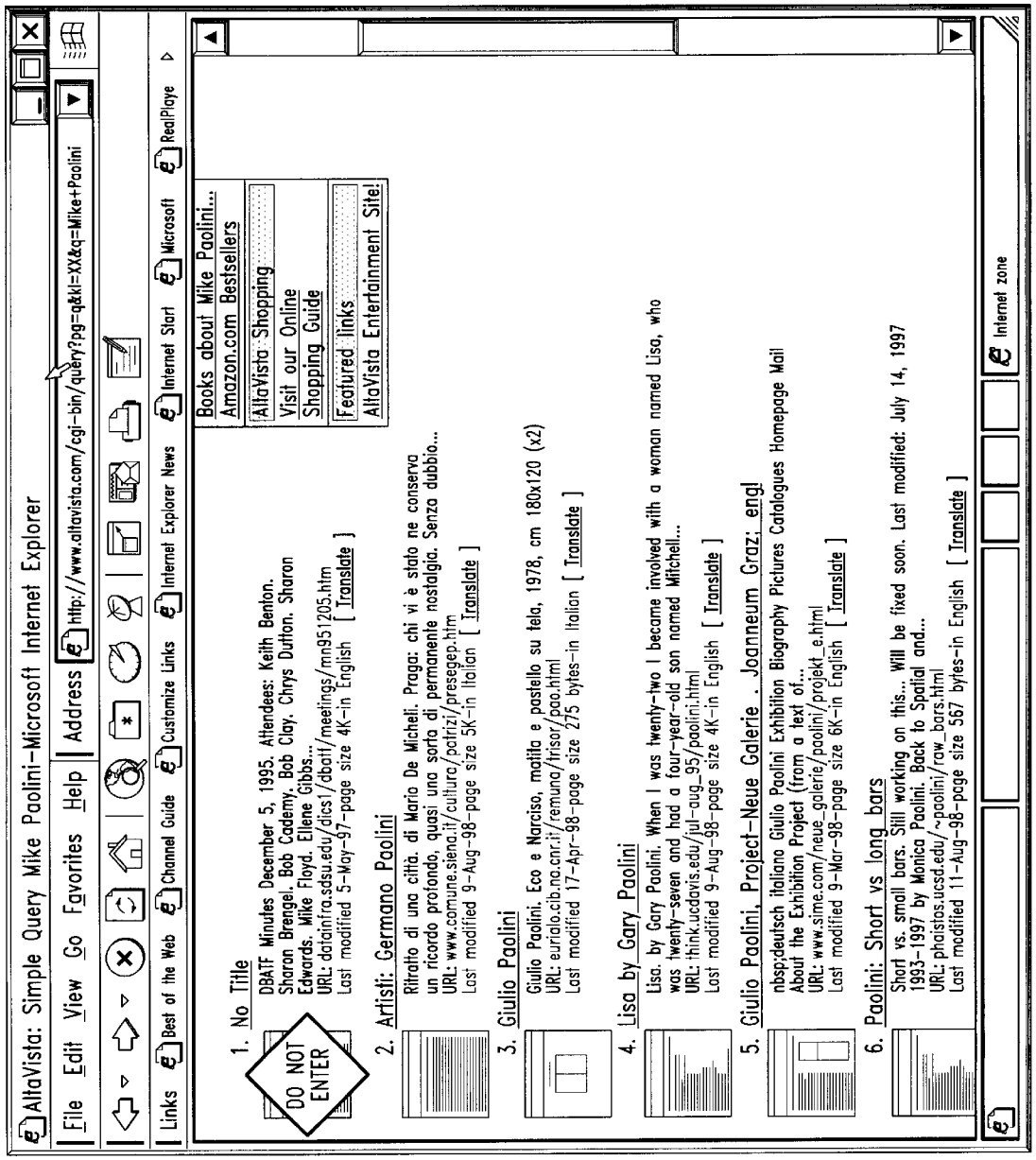

Another example of methods of indicating the presence or absence of user preferences in linked pages is depicted in FIG. 14. FIG. 14 contains the same search results as in FIG. 13. However, the first link's thumbnail image has been replaced by a "Do Not Enter" icon indicating to the user that this linked page contains undesirable or objectionable features to the user. However, replacing a thumbnail image with another graphic is not limited to cases where objectionable material is found. For example, a green and red graphic might be replaced with a graphic or thumbnail using other colors for someone who is color blind. Also, it might be that all or some of the graphics are replaced with a blank image to maintain formatting, but reduce rendering time.

In another example of conveying information to the user, suppose that the user had indicated a preference for pages containing words "Java Programming". An icon representation of JavaScript, or a Java Applet might be placed next to the thumbnail of the link if that link contained the chosen criteria. Information on the age of the web page (if it was present, and the user had selected it as a preference) might also be placed there.

In another example of the presentation of the information provided by the server, any, and all of the information that might be displayed in a "preview window" could also be placed in flyover help for the link.

Examples of methods of indicating the presence of user specified criteria on a presently viewed web page include highlighting the matching text in bold or blocking the matching text in a background color different from the rest of the text. Other examples include replacing obscene words with stars. Other devices for indicating the presence or absence of desired criteria or undesired criteria will be obvious to one skilled in the art.

It is important to note that although searched criteria has been described as being selected by a user, it could also be selected by the maker of the plugin and could include a default setting if the user chooses not to select a criteria. It should also be noted that while the present invention has been described in terms of parsing the linked pages for specified criteria, other methods of determining the content of a linked page may be utilized as well. For example, the information on a linked page may be maintained in the form of an appendix or index page. Another example is to maintain such information in a database where the database might be created by the maker of the data expressly for this purpose or to aid search engines. However, the preferred method remains to actually parse the data in a linked page since that is the only true way to know the content of the data in a linked page since indexes become stale and the words that the author of a linked page might choose to put in a database to describe the content of the linked page might be different than the words chosen by a user.

In another modification to the present invention, the analysis of the prefetched pages is stored in a cache and if the browser recognized a URL, it need not prefetch and reanalyze, but rather may retrieve the information from the cache. However, this assumes that the content of a URL has not changed and that the configuration chosen by the user has not changed. Furthermore, this assumes that the information was of a type that could be cached (e.g., not a secure connection type of which no data is cached/stored). Furthermore, it assumes that caching was enabled (e.g., not everyone has caching turned on in their browser).

It should be noted that, while the present invention has been described primarily with reference to browsing the Internet and the World Wide Web, it is equally applicable to any navigation format where one is using a viewer. For example it may be applied to navigating Lotus Notes Databases, to personal records navigation, and to map navigation. In the case of may navigation, areas of the map may be highlighted. This would be useful in a case of zooming in for greater detailed resolution. Information which is not visible (e.g., because it is so small it cannot be drawn with the scale used) could be considered and treated like a link.

Although the present invention has been described primarily with reference to HTML documents, the present invention applies to other document formats and markup languages as well. For example, such other markup languages include, but are not limited to, Extensible Markup Language (XML), Vector Markup Language (VML), Virtual Reality Markup Language (VRML), Dynamic Hypertext Markup Language (DHTML), and Extended Hypertext Markup Language (XHTML). An example of other document formats includes, but is not limited to, a Postscript Document Format (PDF).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. Although the browser has been illustrated in the form of Netscape Navigator or Microsoft Internet Explorer, it could be applied to any set of applications to send requests and retrieve documents from the Internet or any similar distributed data processing system such as a local area network or intranet. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for presenting content from a page in a distributed database, comprising the steps of:

receiving, at a server, a request from a client for a page from the database, wherein the page has a plurality of links to linked pages in the database;

retrieving the page;

generating, by the server, a set of thumbnails of the linked pages in the database;

identifying a given link within the plurality of links for which a replacement thumbnail is to be displayed; and replacing a thumbnail for the given page with the replacement thumbnail in the set of thumbnails, wherein the replacement thumbnail is one of an icon representing a broken link, an icon representing a link to a page containing an excessive number of broken links, and an icon provided by a content provider of a page associated with the given link.

2. The method as recited in claim 1, further comprising the step of sending the page and the set of thumbnails to the client.

3. The method as recited in claim 2, wherein the replacement thumbnail is manually fine tuned by a content provider of a page associated with the given link prior to the step of sending the set of thumbnails to the client.

4. The method as recited in claim 2, wherein the page is modified by embedding the set of thumbnails into the page prior to sending the page to the client.

5. A computer program product in computer readable media for use in a proxy server for providing content from the page in a distributed database, the computer program product comprising:

first instructions for receiving, at a server, a request from a client for a page from the database wherein the page has a plurality of links to linked pages in the database;

second instructions for retrieving the page;

third instructions for generating a set of thumbnails of the linked pages in the database;

fourth instructions for identifying a given link within the plurality of links for which a replacement thumbnail is to be displayed; and fifth instructions for replacing a thumbnail for the given page with the replacement thumbnail in the set of thumbnails, wherein the replacement thumbnail is one of an icon representing a broken link, an icon representing a link to a page containing an excessive number of broken links, and an icon provided by a content provider of a page associated with the given link.

6. The computer program product as recited in claim 5, further comprising fourth instructions for sending the page and the set of thumbnails to the client.

7. The computer program product as recited in claim 6, wherein the replacement thumbnail is manually fine tuned by a content provider of a page associated with the given link prior to sending the set of thumbnails to the client.

8. The computer program product as recited in claim 6, wherein the page is modified by embedding the set of thumbnails into the page prior to sending the page to the client.

9. A system for providing content from the page in a distributed database, comprising:

means for receiving, at a server, a request from a client for a page from the database wherein the page has a plurality of links to linked pages in the database;

means for retrieving the page;

means for generating a set of thumbnails of the linked pages in the database;

means for dentifying a given link within the plurality of links for which a replacement thumbnail is to be displayed; and means for replacing a thumbnail for the given page with the replacement thumbnail in the set of thumbnails, wherein the replacement thumbnail is one of an icon representing a broken link, an icon representing a link to a page containing an excessive number of broken links, and an icon provided by a content provider of a page associated with the given link.

10. The system as recited in claim 9, further comprising means for sending the page and the set of thumbnails to the client.

11. The system as recited in claim 10, wherein the replacement thumbnail is manually fine tuned by a content provider of a page associated with the given link prior to sending the set of thumbnails to the client.

12. The system as recited in claim 10, wherein the page is modified by embedding the set of thumbnails into the page prior to sending the page to the client.

* * * * *